United States Patent [19]

Becker

[11] Patent Number: 4,809,881

[45] Date of Patent: Mar. 7, 1989

[54] BIN DISPENSING MACHINE

[75] Inventor: Henry A. Becker, Roann, Ind.

[73] Assignee: Total Tote, Inc., North Manchester, Ind.

[21] Appl. No.: 39,587

[22] Filed: Apr. 16, 1987

[51] Int. Cl.⁴ .............................................. B65H 5/00
[52] U.S. Cl. ................... 221/224; 221/236;
221/289; 221/290; 141/172; 141/173;
414/798.1; 414/795.7
[58] Field of Search ............... 221/221, 223, 224, 236,
221/251, 289, 290, 292, 293, 298; 414/125–129,
609, 610, 612, 615; 141/168, 172, 173, 175

[56] References Cited

U.S. PATENT DOCUMENTS

| | | | |
|---|---|---|---|
| 1,362,441 | 12/1920 | Sawhill | 414/615 X |
| 2,629,503 | 2/1953 | Neja | 221/236 X |
| 3,003,661 | 10/1961 | McGrath | 221/290 |
| 3,325,021 | 6/1967 | Burns et al. | 414/127 |
| 3,370,724 | 2/1968 | Burns et al. | 414/127 X |
| 3,468,455 | 9/1969 | Voorhis | 221/236 X |
| 3,869,048 | 3/1975 | Takahashi | 414/127 |
| 3,895,477 | 7/1975 | Yamashita | 414/126 X |
| 4,077,540 | 3/1978 | Butler | 414/126 X |

Primary Examiner—Michael S. Huppert
Assistant Examiner—David H. Bollinger
Attorney, Agent, or Firm—Thomas J. Dodd

[57] ABSTRACT

A machine which supports a stack of bins adapted to store small objects prior to shipment. The machine includes an elevator which acts in conjunction with the bin retainers and a programmable controller to remove one bin from the stack and lower it into a filling position. After the filling is completed the elevator lowers the filled bin onto a transport conveyor which removes the bin to a remote storage area.

10 Claims, 7 Drawing Sheets

BIN DISPENSING MACHINE

SUMMARY OF THE INVENTION

This invention relates to a bin dispensing machine and has application to a machine which automatically destacks bins for holding and storing machine and other fabricated parts.

Small fabricated parts are produced in large quantities by injection and below molding machines, extruders, and other automatic machines. The parts are generally stored in bins with like parts prior to shipping in order to insure an accurate count of parts to be shipped. Current procedure provides for parts fabricated when no workers are on duty to be stored in a single large bin, then counted manually into smaller bins for shipping purposes. This procedure essentially defeats the advantage of having the fabricating machine operative during these periods.

The bin dispensing machine of this invention is adapted to accept a stack of bins for storing a predetermined quantity of parts. As the individual bins are individually needed, the machine unstacks a bin and positions it for loading. After the bin is filled, the machine transfers the bin onto a conveyor after which it is moved to a storage area for eventual shipment. The machine is completely automatic and can operate so long as bins are available. Because of its on-line capabilities, several machines may be used in series with an equal number of part fabricating machines.

Accordingly it is an object of this invention to provide for a machine which destacks empty part storage bins, positions the bins for loading and conveys the filled bins to a storage area.

Another object of this invention is to provide for a bin destacking machine which accurately determines the number of parts stored within each bin.

Another object of this invention is to provide for a bin destacking machine which is versatile and can be used in combination with other like machines.

Still another object of this invention is to provide for a bin destacking machine which is programmable and adaptable to many different bin sizes.

Other objects of this invention will become apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENT

Figure 1:
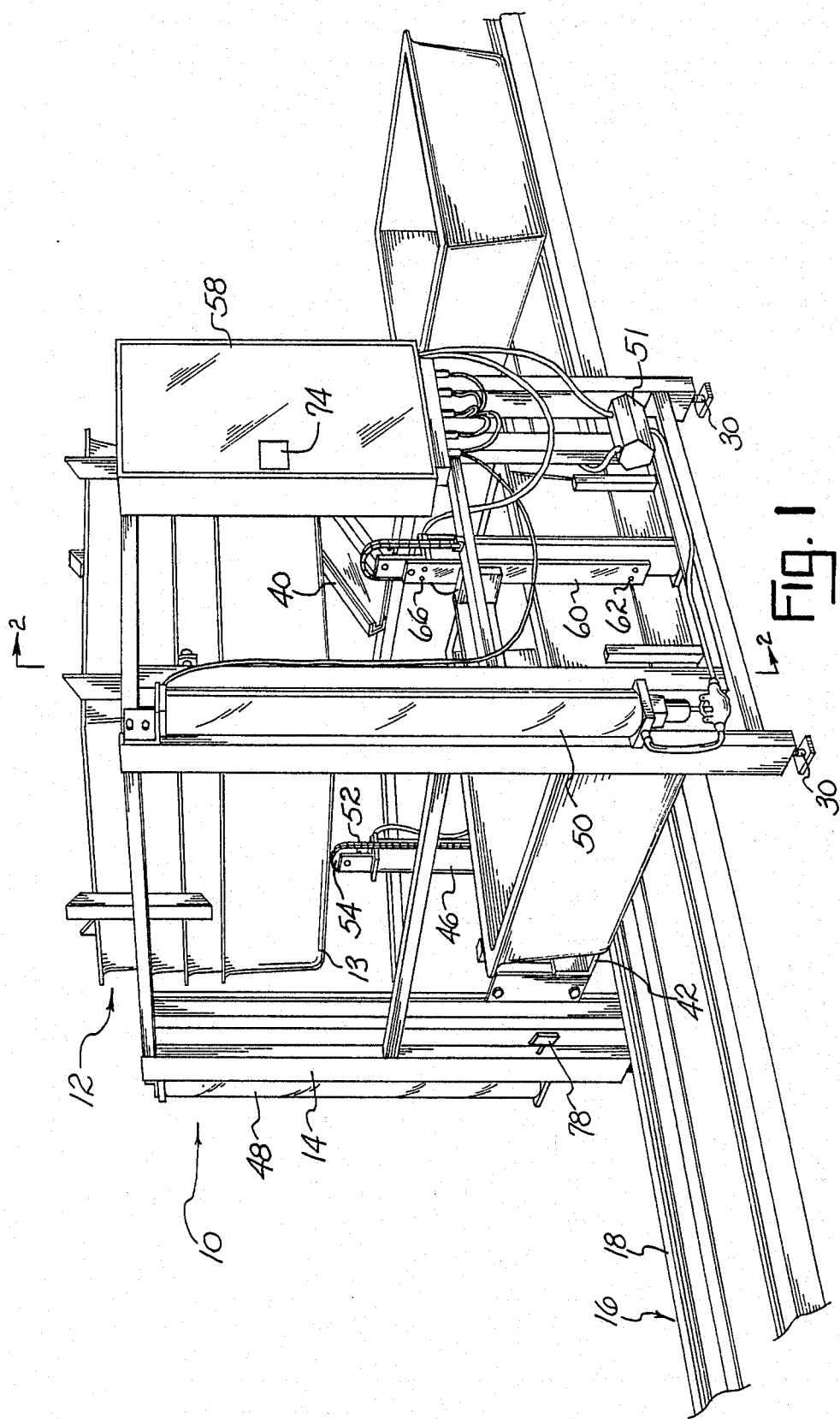
FIG. 1 is a perspective view of the bin dispensing machine with the elevator in the down position.

The preferred embodiment herein described is not intended to be exhaustive or to limit the invention to the precise form disclosed. It is chosen and described to explain the principles of the invention and its application and practical use to thereby enable others skilled in the art to utilize the invention.

Referring now to the drawings, reference numeral 10 generally refers to the bin destacking machine of this invention. Machine 10 is generally adapted to support, destack and dispense a bin 12 which serve to store small items, such as plastic parts produced by an injection molding machine (not shown). Machine 10 includes a frame 14 which houses the mechanical workings and electromechanical control system of the machine, and an endless conveyor 16. Conveyor 16 may be of a conventional construction or of the specialized construction shown in the drawings having a dual leg frame 18 with inturned flanges 20 which support channel parts 22, 24. An endless chain 26 is fitted respectively into channel parts 22, 24 and serves to support bins 12 as they travel from machine 10 towards a storage area at the end (not shown) of the conveyor 16. Machine frame 14 is supported by adjustable height legs 30.

Machine 10 includes a plurality of bin support members or flippers 32 (four are shown) attached to frame 14 which support a stack 13 of bins 12 as shown. Flippers 32 are identical in construction and, as such, only one will be described in detail. Each flipper 32 is pivotally connected to a housing 34 which projects inwardly of machine frame 12. There will preferably be one or more flippers 32 located oppositely of one another on the inner side edges of frame 14. An air cylinder 36 controls the movement of each flipper 32 between an extended position (FIGS. 2, 4–6) supporting bins 12 and a retracted position (FIG. 3) wherein a bin may be dropped for loading.

Machine 10 also includes a bin elevator 38 which serves to transport a bin 12 from its stack 13 into a loading position (FIG. 5) where the bin is loaded with parts (not shown) which travel from a supply machine (not shown) through parts chute 40 into the bin. Elevator 38 then transports the loaded bin 12 to conveyor 16. Elevator 38 includes opposed movable bin support forks 42 connected to elevator rods 44 which are vertically reciprocable within frame 14. Vertical movement of elevator 38 is effected by hydraulic cylinders 46 in conjunction with up air/oil tank 48 and down air/oil tank 50. Correlative movement of each fork 42 is achieved through the action of hydraulic flow divider 51 which insures that the oil volume of each cylinder 46 is the same. Elevator 38 is connected to cylinder 46 through chain 52 anchored to each elevator rod 44 and to frame 14. Chain 52 extends over a sprocket 54 which is keyed for rotative movement to a transverse rod 56 of each cylinder 46 to provide for a 2:1 ratio of elevator 38 to travel to cylinder rod 47. Chain 52 and sprocket 54 provide for a two-to-one ratio of travel of elevator 38 to travel of cylinder rod 47. Tanks 48 and 50 are connected to a programmable control member 58 (FIG. 1) which is well known in the art.

A cam bar 60 is attached to cylinder rod 47. Cam bar 60 travels up and down with rods 47 and includes cam projections 62, 64 and 66. Frame 14 includes roller type limit switch 68 located in the path of travel of cam bar 60 and connected electrically to controller 58. As one of cam projections 62, 64 or 66 contacts limit switch 68, controller 58 is signalled as to the current position of elevator 38.

To fully understand the integral parts of machine 10 and their interconnected function, a detailed description of one cycle of the machine is set forth below.

Figure 2:
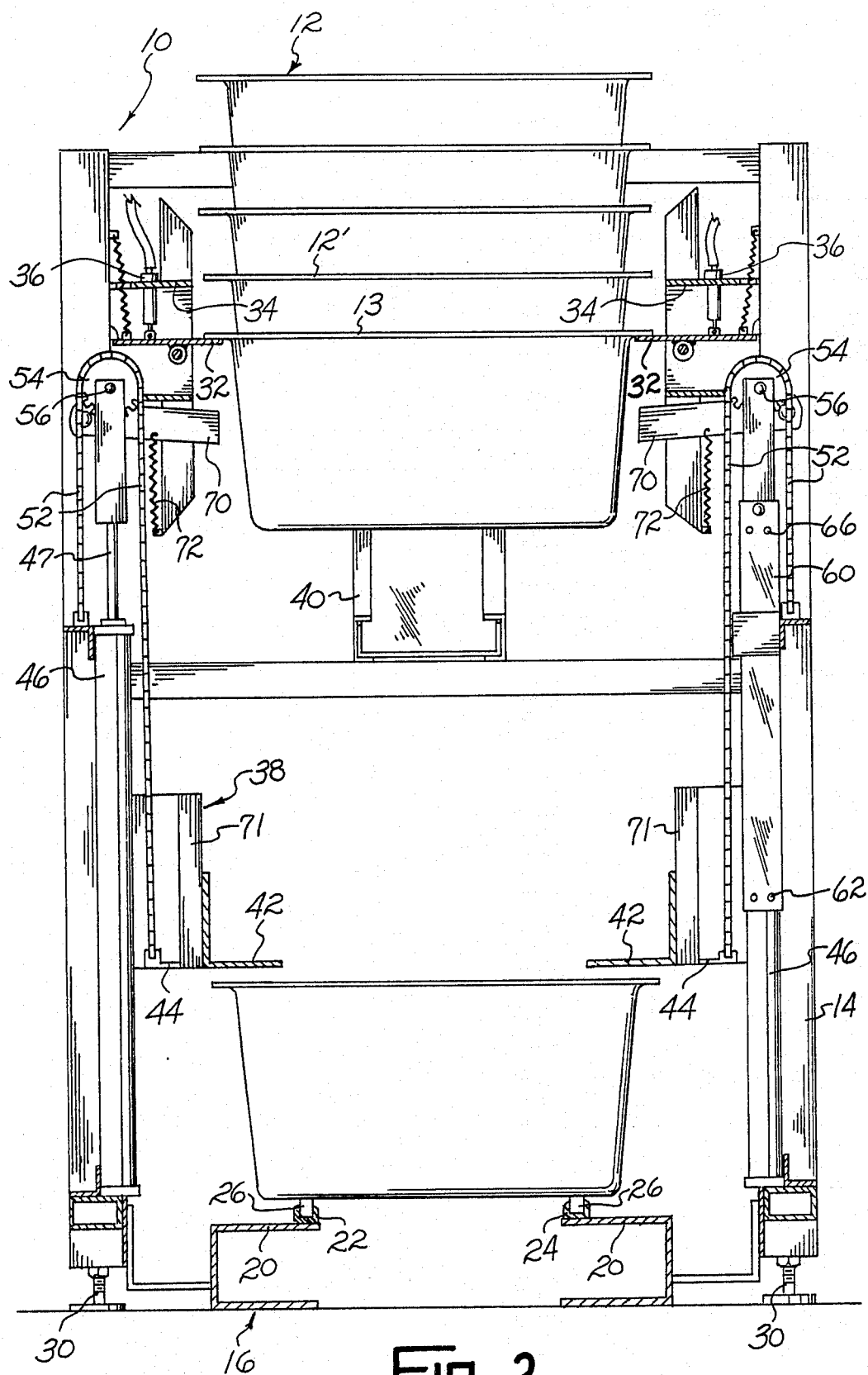
FIG. 2 is a sectional view of the machine taken generally along line 2—2 of FIG. 1 with the elevator in a standby position.
Figure 3:
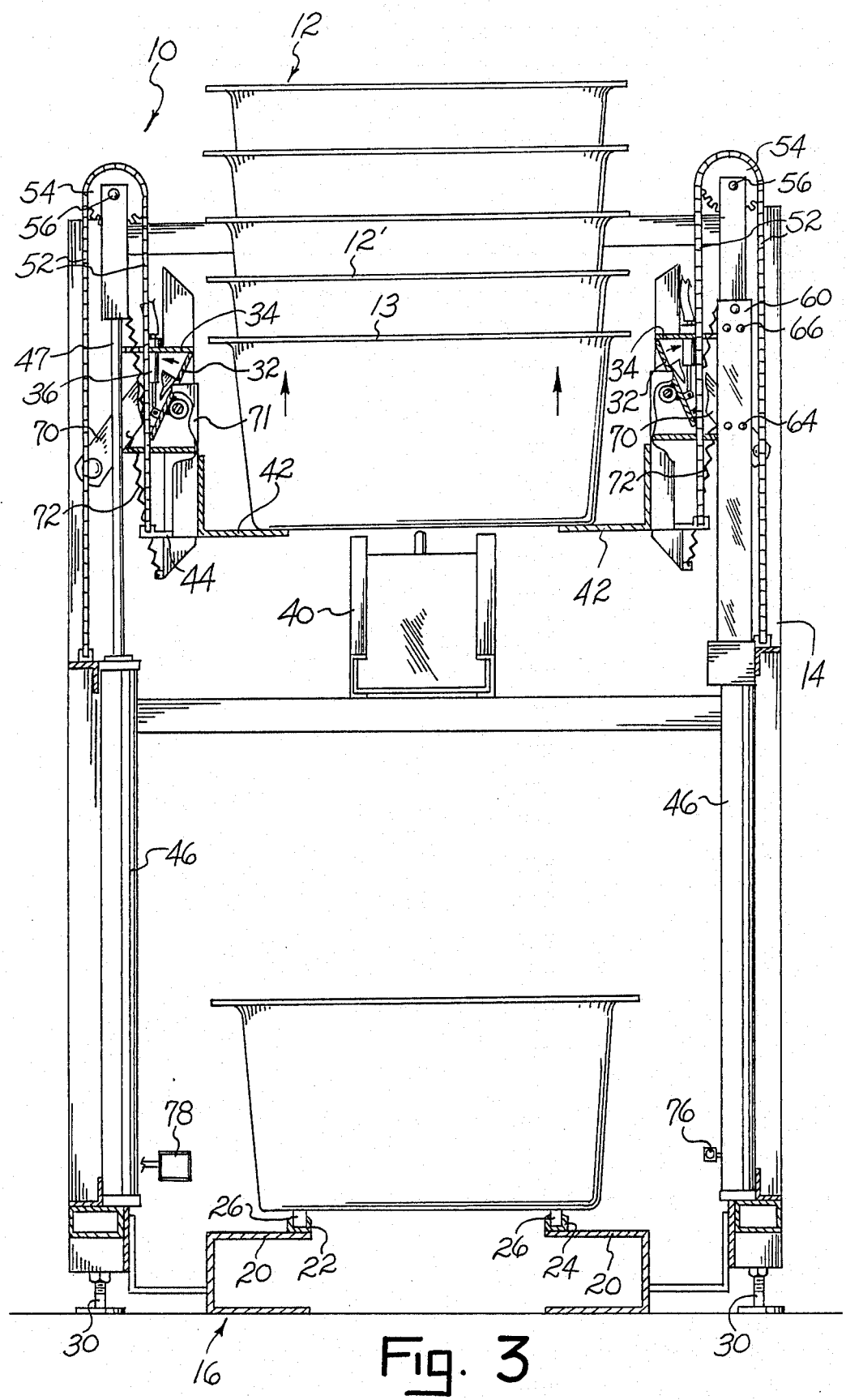
FIG. 3 is a sectional view similar to FIG. 2 showing the elevator just prior to releasing a bin for dispensing.
Figure 4:
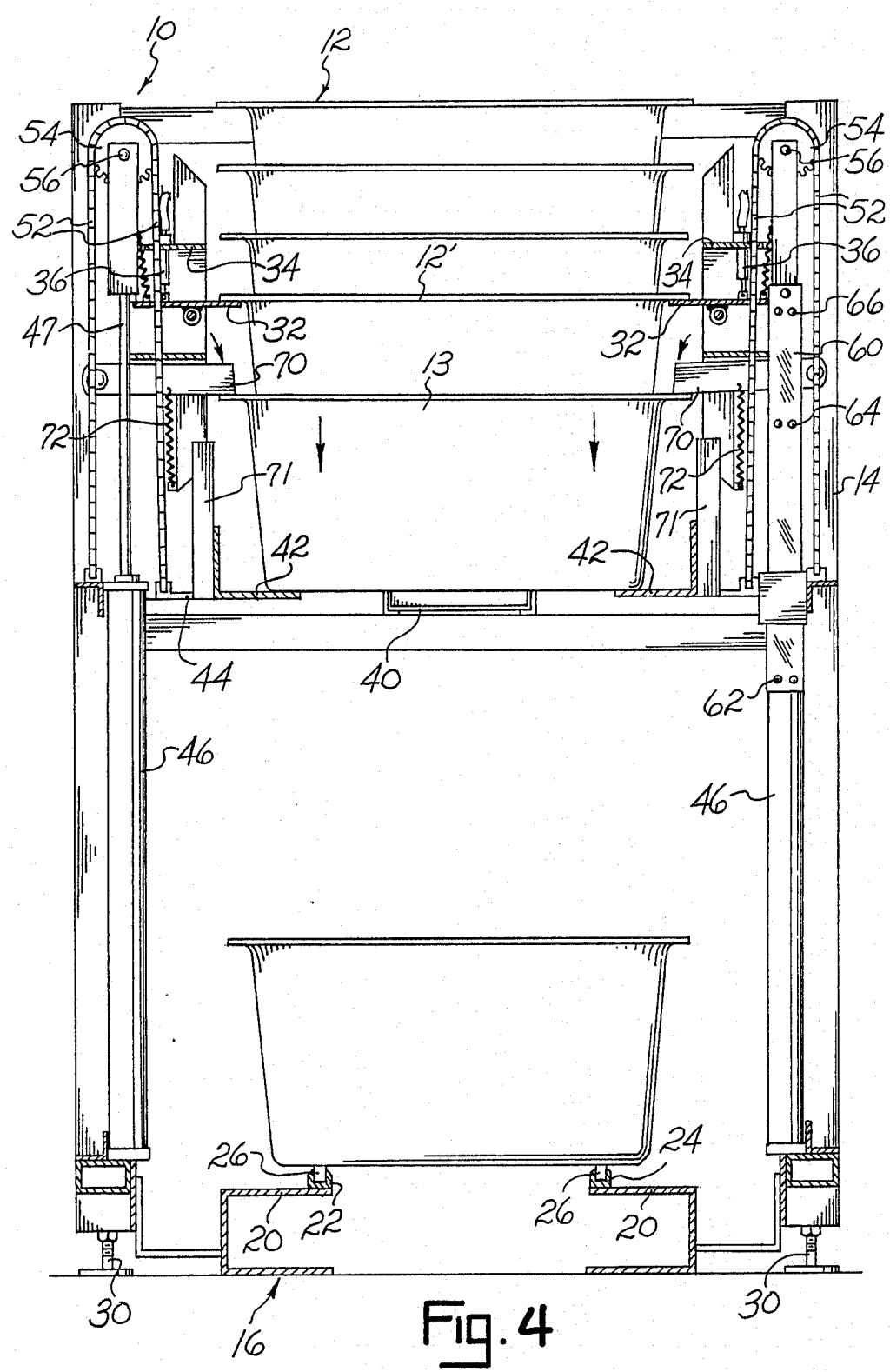
FIG. 4 is a sectional view similar to FIG. 3 showing a single bin being supported by the elevator.
Figure 5:
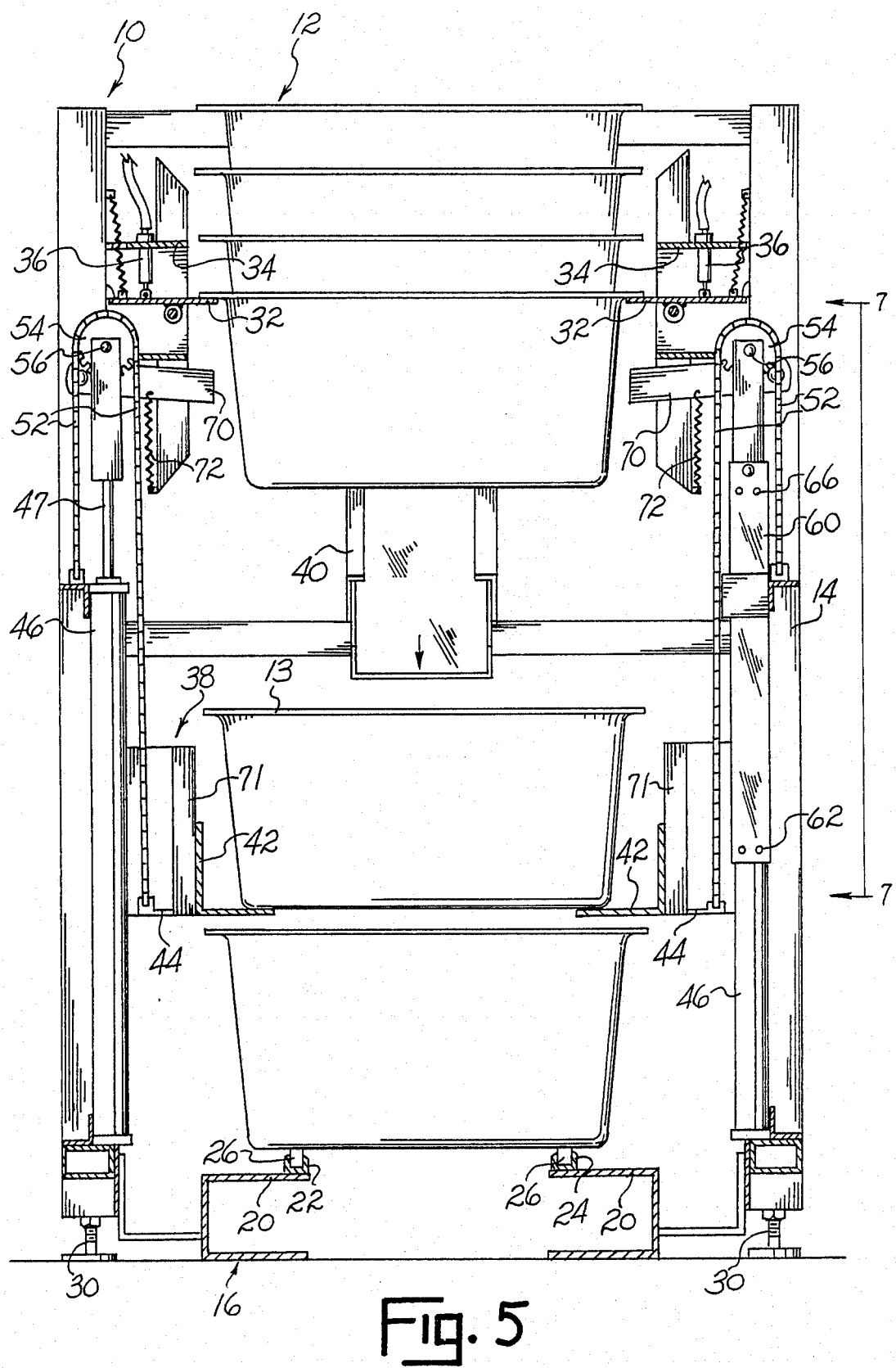
FIG. 5 is a sectional view similar to FIG. 4 with the bin and elevator in the lead position.
Figure 6:
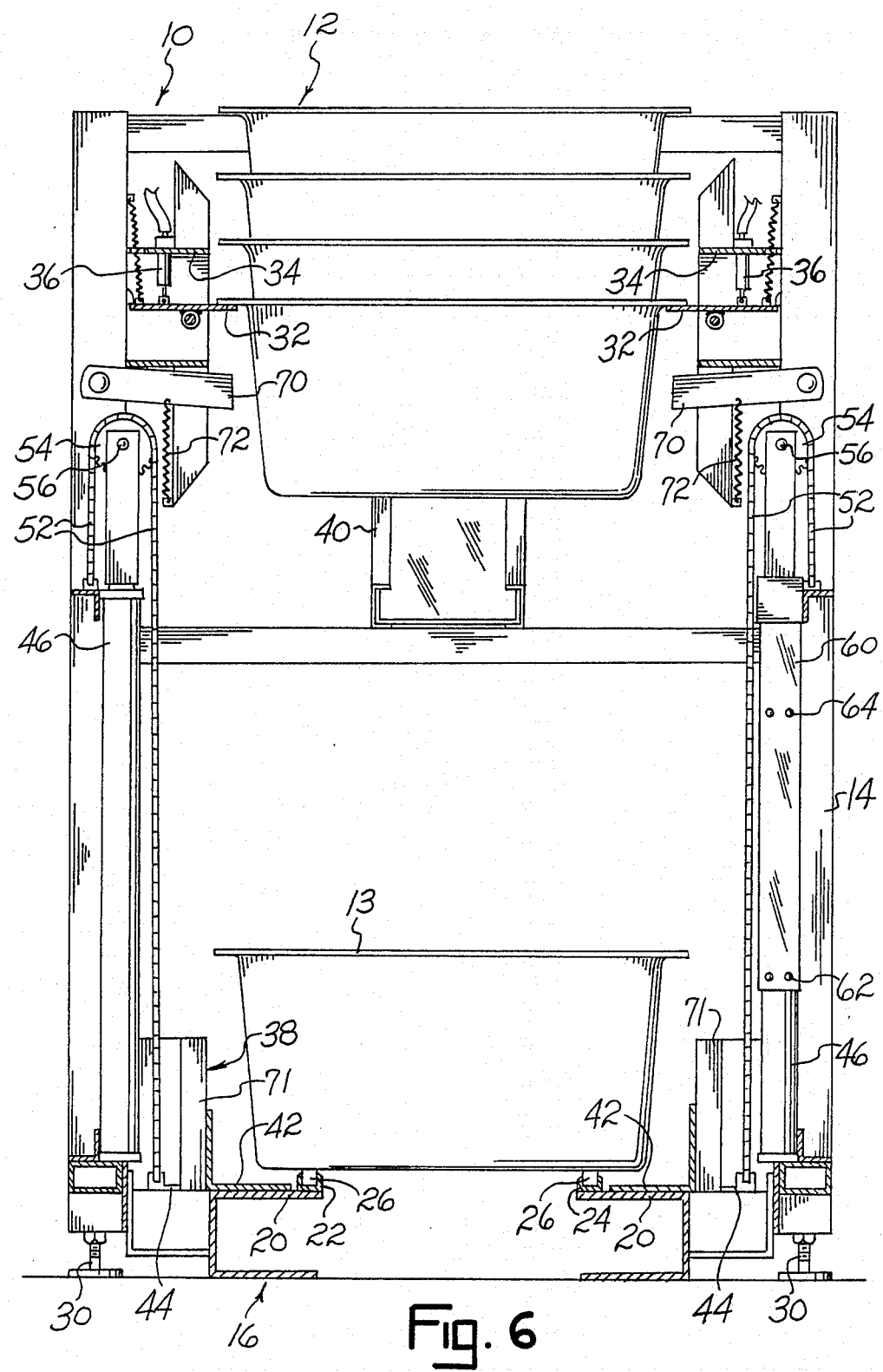
FIG. 6 is a sectional view similar to FIG. 5 with the bin and elevator in the down position.
Figure 7:
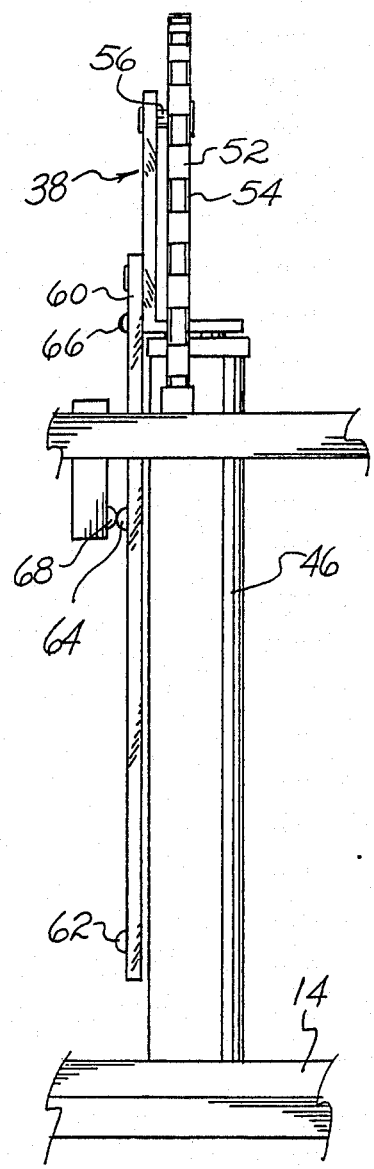
FIG. 7 is a fragmentary end view of the elevator cam rod as seen from line 7—7 of FIG. 5.

With the elevator rods 44 in the standby position shown in FIG. 2, machine 10 is switched on. Programmable control 58 which has already been set, activates elevator 38 through cylinder 46 and tank 48 to cause the elevator support forks 42 to travel upwardly. Support forks 42 contact the lowest bin 12 of stack 13 and elevator continues its upward travel to lift the stack of bins about one half inch. At this time, a stripper bar 71 connected to elevator 38 pushes upwardly on bin stripper arms 70 (FIG. 3). Cam projection 66 which has been travelling upwardly with elevator 38 at this point trips limit switch 68. Limit switch 68 signals programmable control 58 which energizes bin support member valves 36 to cause the flippers 32 to be retracted into their respective housing 34. Programmable control 58 then signals tank 50 to lower elevator 38. As the elevator 38 lowers, cam projection 66 trips limit switch 68 to de-energize bin support member valves 36 which extends flippers 32 under the outer rim of the second bin 12' in stack 13 as shown in FIG. 4. As elevator 38 moves downwardly, bin stripper arms 70 under the influence of their springs 75 urge the lowest bin 12 (now supported by elevator support forks 42 below bin support members 32) downwardly in the event of stickage between bins 12, 12'. Elevator 38 continues downward until cam projection 64 trips limit switch 68 to signal the controller 58 to stop the elevator in the load position (FIG. 5). The controller 58 then actuates the chute extension cylinder not shown to extend the parts chute 40 into bin 12 for loading. Upon the predetermined number of parts being loaded into bin 12, (as determined by counter 74) controller 58 signals hydraulic cylinder 46 and tank 50 to lower bin 12 onto conveyor 16. After a sensing device signals controller 58 that the space below is clear of other bins, the conveyor 16 is stopped by controller 58, and elevator 38 lowers the loaded bin 12 onto the conveyor for transport to a remote storage area. The sensing device preferably will include a conventional photo cell 76 and in-line reflector 78 connected to frame 14 and electrically coupled to controller 58. The elevator 38 continues downwardly for another one half inch or until cam projection 62 trips limit switch 68 to signal controller 58 to start conveyor 16. When sensing device 74 again signals controller 58 that the conveyor space is clear, hydraulic cylinder 46 is again is actuated to raise elevator to the standby position of FIG. 2 continuous operation to a second cycle is now accomplished as described above in the first or sample cycle.

It is understood that the above description does not limit the invention to those precise details given above, but may be modified within the scope of the appended claims.

I claim:

1. A machine for dispensing storage containers, said machine including a frame, retainer means for holding a plurality of containers in a storage position, said machine further including elevator means for removing a single container from said plurality of containers and transporting the single container from said storage position into a filling position wherein the single container is filled with small objects, said elevator means transporting said single container to a transport means for transferring said single container to a storage area, said elevator means including spaced moveable support members adapted for contacting a bottom wall of said single container, said retainer means including retractable members pivotally mounted on said frame, said retractable members movable between an extended position supporting said plurality of containers and a retracted position wherein one or more of said containers are supported upon said elevator means, said machine further including a programmable control means for actuating said retractable members to dispense said single container, said elevator means including a cam bar connected to one of said elevator means support members, said cam bar including spaced projections thereon, said frame including contact actuated switch means for actuating said programmable control means to selectively dispense said single container onto said elevator means and to selectively operate said transport means dependent upon said cam bar position.

2. The machine of claim 1 wherein said transport means is an endless conveyor chain.

3. The machine of claim 2 wherein said conveyor chain includes a frame and an endless chain, spaced channel members carried by said frame carrying said endless chain for movement wherein said containers are transported from the machine to said storage area.

4. The machine of claim 1 wherein said retractable member further include stripping arm means operatively connected thereto said stripping arm means for separating said single container from said plurality of containers in the event of stickage during movement of said elevator means towards said filling position.

5. The machine of claim 1 and means for detecting the presence of a said container on said transport means below said elevator means, and means connected between said detecting means and programmable control means and transport means for selectively actuating said transport means.

6. The machine of claim 5 wherein said detecting means includes a photoelectric cell connected to one of said frame and transport means at an entrance gate of the frame, and a reflector mounted to one of said frame and transport means spaced from said photoelectric cell at an exit gate of the frame.

7. The machine of claim 1 wherein said machine further includes a chute means connected to said frame for directing said small objects into said containers when the elevator means is in said filling position.

8. The machine of claim 7 wherein said chute means is retracted between a loading position wherein said small objects may be loaded into said containers, and a retracted position wherein said elevator means is shiftable into its said filling positions.

9. The machine of claim 1 and means for detecting the presence of a said single container on said transport means below said elevator means, and means connected between said detecting means and programmable means and transport means for selectively actuating said transporting means.

10. The machine of claim 9 wherein said detecting means includes a photoelectric cell connected to one of said frame and transport means at an entrance gate of the frame, and a reflector mounted to one of said frame and transport means spaced from said photoelectric cell at an exit gate of the frame.

* * * * *